US008896715B2

(12) United States Patent
Wu et al.

(10) Patent No.: US 8,896,715 B2
(45) Date of Patent: Nov. 25, 2014

(54) GENERIC PLATFORM VIDEO IMAGE STABILIZATION

(75) Inventors: Yongjun Wu, Redmond, WA (US); Nikola Borisov, Evanston, IL (US); Weidong Zhao, Bellevue, WA (US); Shyam Sadhwani, Bellevue, WA (US); Naveen Thumpudi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/704,047

(22) Filed: Feb. 11, 2010

(65) Prior Publication Data

US 2011/0193978 A1    Aug. 11, 2011

(51) Int. Cl.
*H04N 5/228* (2006.01)
*H04N 5/232* (2006.01)

(52) U.S. Cl.
CPC ........ *H04N 5/23248* (2013.01); *H04N 5/23254* (2013.01); *H04N 5/23267* (2013.01)
USPC ...................................................... 348/208.6

(58) Field of Classification Search
USPC ................... 348/208.99, 208.1, 208.4–208.6, 348/208.13, 226.1–228.1, 169, 154–155, 348/352
See application file for complete search history.

(56) References Cited

U.S. PATENT DOCUMENTS

| | | | |
|---|---|---|---|
| 5,259,040 A | 11/1993 | Hanna | |
| 5,629,988 A | 5/1997 | Burt et al. | |
| 5,748,231 A | 5/1998 | Park et al. | |
| 5,973,733 A | 10/1999 | Gove | |
| 6,097,854 A | 8/2000 | Szeliski et al. | |
| 7,010,174 B2 | 3/2006 | Kang et al. | |
| 7,061,524 B2 | 6/2006 | Liu et al. | |
| 7,119,837 B2 | 10/2006 | Soupliotis et al. | |
| 7,227,896 B2 * | 6/2007 | Sun ........................... | 375/240.16 |
| 7,346,109 B2 | 3/2008 | Nair et al. | |
| 7,454,136 B2 | 11/2008 | Raskar et al. | |
| 7,489,341 B2 | 2/2009 | Yang et al. | |

(Continued)

FOREIGN PATENT DOCUMENTS

EP         0986252         3/2000

OTHER PUBLICATIONS

Battiato et al., "Fuzzy-based Motion Estimation for Video Stabilization using SIFT interest points," *Proceedings of SPIE* vol. 7250, Jan. 19, 2009, 8 pages.

(Continued)

*Primary Examiner* — Twyler Haskins
*Assistant Examiner* — Carramah J Quiett
(74) *Attorney, Agent, or Firm* — Timothy Churna; Andrew Sanders; Micky Minhas (57) ABSTRACT

Video image stabilization provides better performance on a generic platform for computing devices by evaluating available multimedia digital signal processing components, and selecting the available components to utilize according to a hierarchy structure for video stabilization performance for processing parts of the video stabilization. The video stabilization has improved motion vector estimation that employs refinement motion vector searching according to a pyramid block structure relationship starting from a downsampled resolution version of the video frames. The video stabilization also improves global motion transform estimation by performing a random sample consensus approach for processing the local motion vectors, and selection criteria for motion vector reliability. The video stabilization achieves the removal of hand shakiness smoothly by real-time one-pass or off-line two-pass temporal smoothing with error detection and correction.

25 Claims, 8 Drawing Sheets

(56) References Cited

U.S. PATENT DOCUMENTS

| | | | |
|---|---|---|---|
| 7,557,832 | B2 | 7/2009 | Lindenstruth et al. |
| 7,649,549 | B2 | 1/2010 | Batur |
| 8,284,205 | B2 | 10/2012 | Miller et al. |
| 8,422,550 | B2 | 4/2013 | Li |
| 8,711,248 | B2 | 4/2014 | Jandhyala et al. |
| 2005/0046702 | A1 | 3/2005 | Katayama et al. |
| 2005/0099504 | A1 | 5/2005 | Nayar et al. |
| 2005/0206785 | A1 | 9/2005 | Swan et al. |
| 2006/0066728 | A1 | 3/2006 | Batur |
| 2006/0274156 | A1 | 12/2006 | Rabbani et al. |
| 2006/0280334 | A1 | 12/2006 | Rav-Acha |
| 2007/0014470 | A1 | 1/2007 | Sloan |
| 2007/0201560 | A1 | 8/2007 | Segall et al. |
| 2007/0201562 | A1 | 8/2007 | Ganesh et al. |
| 2007/0242900 | A1 | 10/2007 | Chen et al. |
| 2007/0292047 | A1* | 12/2007 | Jiao et al. .................. 382/279 |
| 2007/0297513 | A1* | 12/2007 | Biswas et al. ............ 375/240.16 |
| 2008/0232445 | A1 | 9/2008 | Forsell |
| 2008/0246848 | A1 | 10/2008 | Tsubaki et al. |
| 2009/0051777 | A1 | 2/2009 | Lee et al. |
| 2009/0180555 | A1 | 7/2009 | Sun et al. |
| 2009/0256918 | A1 | 10/2009 | Rabinowitz et al. |
| 2009/0263009 | A1 | 10/2009 | Krishnaswamy et al. |
| 2010/0183071 | A1 | 7/2010 | Segall et al. |
| 2010/0208087 | A1 | 8/2010 | Ogawa |
| 2010/0271512 | A1 | 10/2010 | Garten |
| 2010/0302448 | A1 | 12/2010 | Zhu |
| 2011/0019014 | A1 | 1/2011 | Oh et al. |
| 2012/0105654 | A1 | 5/2012 | Kwatra et al. |
| 2012/0218442 | A1 | 8/2012 | Jandhyala et al. |
| 2013/0033612 | A1 | 2/2013 | Wu et al. |

OTHER PUBLICATIONS

Battiato et al., "A Robust Video Stabilization System by Adaptive Motion Vectors Filtering," *2008 IEEE International Conference on Multimedia and Expo*, Jun. 23, 2008, 4 pages.

Bergen et al., "Hierarchical Model-Based Motion Estimation," *Proceedings of the Second European Conference on Computer Vision*, 1992, 16 pages.

U.S. Appl. No. 12/197,922, filed Aug. 25, 2008, Sun et al.

U.S. Appl. No. 12/700,292, filed Feb. 4, 2010, Sun.

Bill Crow's Digital Imaging & Photography Blog, "JPEG XR is Now an International Standard," 2 pp., downloaded from http://blogs.msdn.com/b/billcrow/archive/2009/07/29/jpeg-xr-is-now-an-international-standard.aspx (document marked Jul. 29, 2009).

Debevec et al., "Recovering High Dynamic Range Radiance Maps from Photographs," *Proc. 24th Annual Conf. on Computer Graphics and Interactive Techniques*, 10 pp. (1997).

Drago et al., "Design of a Tone Mapping Operator for High Dynamic Range Images based upon Psychophysical Evaluation and Preference Mapping," *SPIE Proc. on Human Vision and Electronic Imaging VIII*, vol. 5007, pp. 321-331 (Jun. 2003).

Duran et al., "Fast Bilateral Filtering for the Display of High-Dynamic-Range Images," *Proc. 29th Annual conf. on Computer Graphics and Interactive Techniques*, vol. 21, No. 3, pp. 257-266 (Jul. 2002).

Fattal et al., "Gradient Domain High Dynamic Range Compression," *Proc. Annual Conf. on Computer Graphics and Interactive Techniques*, vol. 21, Issue 3, 8 pp. (Jul. 2002).

Gallo et al., "Artifact-free High Dynamic Range Imaging," *IEEE Int'l Conf. on Computational Photography*, 7 pp. (Apr. 2009).

Lucas et al., "An Iterative Image Registration Technique with an Application to Stereo Vision," *Proc. 7th Int'l Joint Conf. on Artificial Intelligence*, vol. 2, pp. 674-679 (Aug. 1981).

Mann et al., "Painting with Looks: Photographic images from video using quantimetric processing," *ACM Multimedia*, 10 pp. (2002).

Mitsunaga et al., "Radiometric Self Calibration," *IEEE*, pp. 374-380 (Jun. 1999).

Nayar et al., "High Dynamic Range Imaging: Spatially Varying Pixel Exposures," *IEEE Proc. on Computer Vision and Pattern Recognition*, vol. 1, pp. 472-479 (Jun. 2000).

Peng et al., "DSP Implementation of Digital Image Stabilizer," *IEEE Int'l Conf. on Multimedia and Expo*, 4 pp. (Jul. 2005).

Qiu et al., "Hierarchical Tone Mapping for High Dynamic Range Image Visualization," *Proc. SPIE Visual Communications and Image Processing*, vol. 5960, 9 pp. (Jun. 2005).

Reinhard et al., "Photographic Tone Reproduction for Digital Images," *Proc. 29th Annual conf. on Computer Graphics and Interactive Techniques*, vol. 21, No. 3, pp. 267-276 (Jul. 2002).

Tang, "HDR Photos and Photoshop," 13 pp., downloaded from http://photoshoptutorials.ws/photoshop-tutorials/general/basics/hdr-photos-and-photoshop.html (document marked Apr. 6, 2008).

Tang, "Layered HDR Tone Mapping," 12 pp., downloaded from http://photoshoptutorials.ws/photoshop-tutorials/photo-manipulation/layered-hdr-tone-mapping.html (document marked May 30, 2007).

Tsin et al., "Statistical Calibration of CCD Imaging Process," *IEEE Proc. Int'l Conf. on Computer Vision*, 8 pp. (Jul. 2001).

Wikipedia, "Covariance," 3 pp., downloaded from http://en.wikipedia.org/wiki/Covariance (downloaded on May 13, 2011).

Wikipedia, "Cross-correlation," 4 pp., downloaded from http://en.wikipedia.org/wiki/Cross-correlation#Normalized_cross-correlation (downloaded on Dec. 30, 2009).

Wikipedia, "High dynamic range rendering," 7 pp., downloaded from http://en.wikipedia.org/wiki/High_dynamic_range_rendering (downloaded on Jan. 5, 2010).

Wikipedia, "Sum of absolute differences," 2 pp., downloaded from http://en.wikipedia.org/wiki/Sum_of_absolute_differences (downloaded on May 13, 2011).

Zimmer et al., "Freehand HDR Imaging of Moving Scenes with Simultaneous Resolution Enhancement," 24 pp. (document marked Dec. 2010).

International Search Report dated Sep. 26, 2011, from International Patent Application No. PCT/US2011/023839, 3 pp.

Written Opinion dated Sep. 26, 2011, from International Patent Application No. PCT/US2011/023839, 4 pp.

Patent Examination Report No. 1 dated Mar. 27, 2014, from Australian Patent Application No. 2011216119, 3 pp.

Bosco et al., "Digital Video Stabilization through Curve Warping Techniques," IEEE Transactions on Consumer Electronics, vol. 54, No. 2, 6 pages (May 2008).

Olympus—Image Stabiliser, downloaded from http://www.olympus-europa.com/consumer/dslr_16742.htm#16745, 1 pg. (document not dated, downloaded on May 4, 2011).

Pal et al., "Employing DSPs for Image Stabilization," EE Times-Asia, downloaded from http://www.eetasia.com/STATIC/PDF/200908/EEOL_2009AUG21_DSP_TA_01.pdf?SOURCES=DOWNLOAD, 4 pp. (Aug. 21, 2009.).

Patel, "Video Stabilization & Integration with H.264 Encoder," Master of Technology Dissertation, VLSI Design Tools and Technology Indian Institute of Technology Delhi, 46 pages (May 2009).

Vermeulen, "Real-time Video Stabilization for Moving Platforms," 21st Bristol UAV Systems Conference, Apr. 2007, pp. 1-14 (2007).

First Office Action and Search Report dated Jul. 15, 2014, from Chinese Patent Application No. 201180009337.3, 12 pp.

\* cited by examiner

DOWNSAMPLING FOR PYRAMIDAL BLOCK MOTION ESTIMATION

GLOBAL MOTION TRANSFORM MODELS

GENERIC PLATFORM VIDEO IMAGE STABILIZATION

BACKGROUND

It is increasingly common for video camera capabilities to be incorporated into multi-purpose, small and light-weight handheld electronic devices, such as mobile phones, compact cameras and media players. Unlike the larger dedicated-purpose video camcorders, such multi-purpose handheld devices typically lack any mechanical or optical mechanism to reduce jittery video motion due to a shaky or unsteady hand. Due to their lighter weight and typical use of a wide angle lens, the multi-purpose handheld devices can be more susceptible to jittery video motion from hand shakiness. Further, as the availability of these inexpensive multi-purpose handheld devices spreads the popularity of shooting video beyond the community of amateur and professional videographers, consumer video is more and more commonly produced by users with very little training or experience in how to shoot quality video. There is also a growing popularity among consumers to share short video clips over the Internet via email, blogs, video sharing web sites and social networking sites. Particularly for those users who are not videography professionals or hobbyists, the video clips are often uploaded to the web site (sometimes directly from the video capture device) without any editing or other processing. For these various reasons, the quality of video clips shared on the web is very often quite poor, and the video clips commonly suffer from jittery video motion due to hand shakiness.

Digital video image stabilization is a digital signal processing technique that can be applied to video to correct jittery video motion from hand shakiness. In one exemplary implementation, the technique involves calculating local motion estimation for macroblocks of each image of the video sequence relative to its preceding image; processing the local motion vectors of the macroblocks to produce an estimate of the global motion due to jitter; and then compensating for the jittery video motion by digital shifting or warping the image in a direction opposite to the estimated jitter motion.

One drawback of known digital video image stabilization is that the technique is quite computationally intensive. When uploading video to a blog, video sharing web site or social networking site, the video may be uploaded from devices that vary in processing capabilities. Moreover, the casual user may be more interested in immediacy of quickly posting their video to a video sharing or social networking site, such that any time consuming processing of the video is undesirable. For example, video may be uploaded directly from a multi-purpose handheld device, such as over a cellular network. However, the multi-purpose handheld device (such as a mobile phone) often has limited processing resources, or must share processing resources with other capabilities of the multi-purpose device. Alternatively, the handheld device also could be connected to a PC, laptop, netbook or like devices with internet connectivity to upload video to a video sharing or social networking site. However, these internet-connected PCs also vary greatly in processing resources. Also, in the interest of immediacy, any processing delays during posting via an internet-connected device can be undesirable.

For these reasons, a video image stabilization technique that operates effectively across the various available computing platforms would be useful and desired.

SUMMARY

In summary, the detailed description relates generally to digital video processing for image stabilization of a video sequence.

The following Detailed Description pertains to systems and methods that implement video stabilization on generic platform, which effectively utilizes available multimedia digital signal processing components to provide better performance. For example, the video stabilization on generic platform is programmed in an executable library that provides programming functions to utilize any of various multimedia digital signal processing components that may be provided on computing devices having the generic platform. The implementation of the video stabilization operates on the generic platform by evaluating the computing device on which it is being run for any available multimedia digital signal processing components on the computing device. The implementation of the video stabilization on generic platform then determines which available multimedia digital signal processing component or components to utilize for processing one or more parts of the video stabilization according to a hierarchy structure that orders multimedia digital signal processing components by criteria including at least performance for video image stabilization. The implementation then processes a video for video image stabilization including executing the executable library functions utilizing the determined multimedia digital signal processing components on those parts of processing of the video image stabilization.

In some implementations presented in the following Detailed Description, the video image stabilization uses a form of local motion vector estimation that emphasizes consistency of motion vectors among neighboring blocks of a video frame. In this local motion vector estimation, the frame and its reference frame are downsampled one or more times to form a plurality of versions of the frame and reference frame at a plurality of resolutions. A lowest resolution version of the frame has a plurality of blocks associated as a pyramid structure to a successively larger number of blocks at corresponding locations in each higher resolution version of the frame. The motion vector estimation process begins with the lowest resolution version of the frame, estimating motion vectors of the blocks of the lowest resolution version frame using a full search of the associated lowest resolution version reference frame. Then, for each successively higher resolution version of the frame, the motion vectors for the blocks of the higher resolution version frame are estimated using a refinement search starting from the motion vector estimated for the associated block of the preceding lower resolution version frame according to the pyramid structure. After repeating for each higher resolution version up to the full resolution version of the frame, this produces estimated local motion vectors for the blocks of the full resolution version frame that better emphasize consistency among neighboring blocks. This more consistent estimate of local motion vectors better emphasizes the global motion of the frame.

In some implementations presented in the following Detailed Description, the video image stabilization includes ways to process motion vectors for more reliably estimating global motion of frames in the video. These include selecting a set of motion vectors that more reliably reflect the frames global motion, such as by eliminating motion vectors on picture boundaries, eliminating motion vectors that produce high motion compensation residuals, and motion vectors of blocks with low variance. The video image stabilization also may include detection and removal of motion vector outliers by estimating parameters of a global motion transform using a random sample consensus approach. The video image stabilization also may estimate the global motion transform based on a similarity motion model that may better model jitter video motion from hand shakiness.

In some implementations presented in the following Detailed Description, the video image stabilization may also subject the estimation of the global motion transform corresponding to jittery video motion to limit thresholds for detection and correction of errors in the global motion estimation. The video image stabilization compares the parameters of the estimated global motion transform to the two limits If the upper limit is exceeded, the estimate of the global motion transform is reset. If the parameters exceed lower limit, the parameters of the estimated global motion transform are limited to their lower limit Otherwise, the estimated global motion transform is used unchanged.

In some implementations presented in the following Detailed Description, the video image stabilization performs temporal smoothing of the global motion transforms estimated for the frames.

The following Detailed Description presents variations of the video image stabilization that may be employed in real time playback or transcoding scenarios, as well as variations suitable for off-line video stabilization. In the real-time mode, the video image stabilization may be performed using a single pass processing of the local motion vectors to produce the estimates of global motion of the frames. In the off-line mode, the video image stabilization may perform the motion vector processing in two passes. For example, the first motion vector processing pass may be used to gather statistical information about the motion vectors, such as probability distributions of the motion vectors across the frames of the scene of the video segment. This statistical information can be used to adaptively determine the limits applied to the global motion transform estimation. The information from a first pass also may be used in the temporal smoothing of the global motion transforms. For example, the information can be used to determine constraint limits for constrained global optimization of the temporal smoothing. In addition, the first pass in off line mode also can be used for detecting scene changes in a video segment.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns systems and techniques to provide digital video image stabilization, and more particularly concerns digital video image stabilization techniques operable on a generic computation hardware platform while effectively utilizing available multimedia digital signal processing (DSP) hardware components. The digital video image stabilization techniques can be practiced across a variety of hardware devices, including handheld and portable computing devices, video cameras, mobile phones, entertainment consoles (e.g., video game consoles and television set-top box), various network client computers (e.g., personal computers, laptop, netbook, and tablet computers), as well as server computers. The digital video image stabilization techniques can also be used in a variety of usage and computation scenarios, including video processing on a dedicated video capture device, video processing on a stand-alone computer, video processing on a network client computer and video processing on a server computer. Further, various parts of the digital video image stabilization technique can be performed in parallel or cooperatively on multiple computing devices, such as in a client/server, network "cloud" service or peer computing arrangement, among others. Accordingly, it should be recognized that the techniques can be realized on a variety of different electronic and computing devices, including both end user consumer operated devices as well as server computers that may provide the techniques as part of a service offering to customers.

Hierarchical Selection of Multimedia DSP Components on Generic Platform for Digital Video Image Stabilization The processing of video, and more particularly the processing of the digital video image stabilization techniques described herein, is inevitably computationally intensive. On the other hand, the digital video image stabilization techniques can be practiced on a variety of computing devices, whose configuration of multimedia processing hardware components can vary widely from each other. One way for the digital video image stabilization techniques described herein to achieve better potential performance and quality is that the techniques evaluate the target computing device on which they are run, and choose to utilize available multimedia processing components according to a hierarchy constructed in a way that considers one or more aspects of performance, quality, power consumption, conformance, and robustness. In this way, the digital video image stabilization techniques are developed for a generic operating platform, and then adapt to best utilize multimedia processing capabilities of the actual target computing hardware on which they are run.

In one example implementation, the digital video image stabilization techniques described below are implemented in an executable program to be run on a computing device (described in more detail below), such as a dynamic link library file (DLL) or as an application program executable file. When implemented as a DLL or other executable library file, the executable program implements the digital video image stabilization as a set of library functions, and provides a programmatic interface for application programs to make programmatic use of the digital video image stabilization functionality implemented by the executable program. The executable program runs on a generic platform or computing environment, which is to say that the executable program can run on a variety of computers and computing devices that may include varying multimedia digital signal processing (DSP) components.

Figure 1:
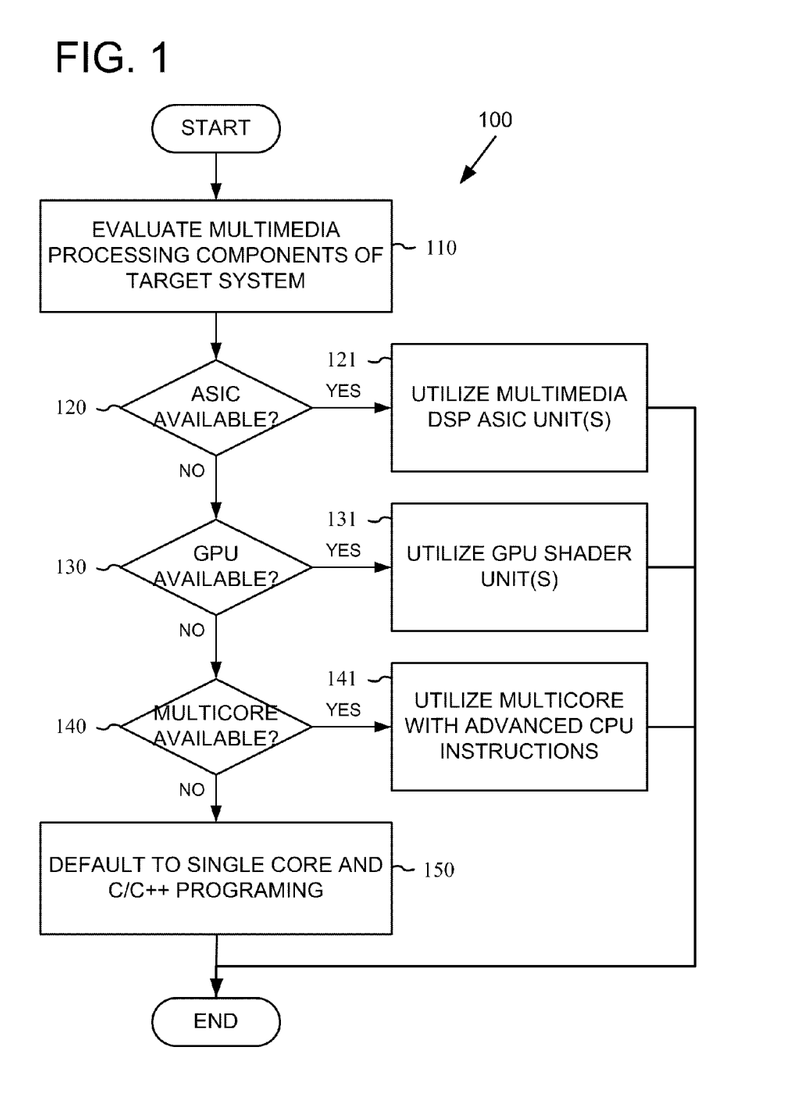
FIG. 1 is a flow diagram of a method for a generic platform digital video image stabilization technique to most effectively utilize available multimedia digital signal processing components according to a computation performance hierarchy.

With reference to FIG. 1, the digital video image stabilization library program includes programming to perform video processing for the digital video image stabilization using various multimedia DSP components that potentially may be available on the target computing device on which the program is run. The program then adapts to best utilize the multimedia DSP components via the multimedia utilization hierarchy process 100. In a first action 110 of this process 100, the library program evaluates the multimedia DSP components of the target computing system or device on which it has been installed and is being run. The library program can perform this evaluation by making a call to an operating system service for querying system information, by examining system information recorded in a registry or other system database, by calling programming interfaces associated with multimedia DSP components, by attempting access to multimedia DPS components or by other like ways to access system information and/or query the presence of hardware components.

Based on the results of the evaluation in action 110, the library program then chooses from the multimedia DSP components determined to be available on the target computing device according the processing hierarchy. In the illustrated example, the library program first chooses to utilize any available ASIC units that are adapted for multimedia DSP in the target computing device as shown in actions 120-121. Examples of current commercially available such ASIC units include video cards from Intel (known by the name Larrabee) and Nvidia (named Tesla). If no such ASIC units are available on the target device, the library program next chooses to utilize any available graphics processing unit with shader capability on the target device as shown in actions 130-131. If no ASIC or GPU shader components are present, the library program chooses to utilize any available multi-core processor or central processing unit with advanced multimedia instruction set (e.g., SSEx instructions). Finally, if none of these higher performance multimedia DSP components are available on the target device, the library program falls back to performing video processing of the digital video image stabilization techniques on a single core CPU using C/C++ programming as shown in action 150. In other alternative implementations, other hierarchies of multimedia DSP components can be used based on consideration of the above-mentioned aspects of performance, quality, power consumption, conformance, and robustness for multimedia DSP components that may then be available in commercially available computing device hardware of the generic platform. Such alternative implementations can include utilization of fewer or additional multimedia DSP components than in the illustrated hierarchical multimedia DSP utilization process 100.

Digital Video Image Stabilization on Generic Platform

Figure 2:
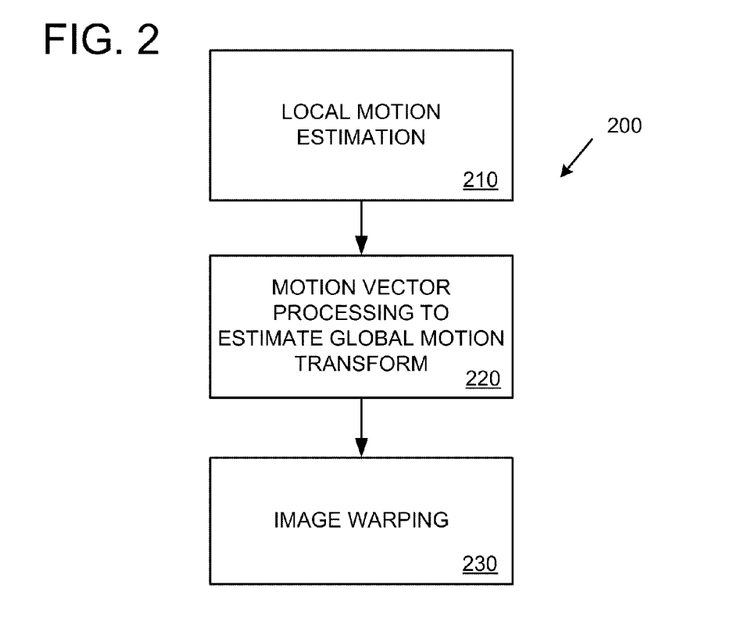
FIG. 2 is a flow diagram of a three part digital video image stabilization process, which utilizes available multimedia digital signal processing components of the target computing device according to the hierarchical utilization process of FIG. 1.

As illustrated in FIG. 2, the digital video image stabilization techniques performs processing of a subject video involving generally three parts: local motion estimation 210, motion vector processing to estimate a global motion transform corresponding to video jitter from hand shakiness 220, and image warping to compensate the video jitter motion. The local motion estimation 210 and image warping 230 are computationally intensive, and most desirably are done using the choice from any available multimedia DSP components on the target computing device chosen according to the hierarchical DSP utilization shown in FIG. 1 and discussed above. For example, a form of the local motion estimation 210 that is particularly suited for processing utilizing GPU shaders can be implemented in the library program and used to accomplish the local motion estimation part of the digital video image stabilization when the target computing device has a GPU shader capability among its available multimedia DPS components. On the other hand, the library program can include the functionality to perform the image warping 230 using a D3D API call when the evaluated target computing device is determined to posses that capability among its available multimedia DSP components. The second part 220, processing local motion vectors to estimate the global motion transform is done on the CPU in the example implementation.

Pyramid Block Based ME on GPGPU

In one example implementation, the library program for the digital video image stabilization includes programming to implement the local motion estimation 210 using a pyramid block based motion estimation technique illustrated in FIGS. 3-7 that is particularly well suited for processing in a GPU shader (when determined to be available on the target computing device by the process 100 discussed above). As compared to individually estimating local motion for blocks of the full resolution video frames, the pyramid block-based motion estimation technique also emphasizes global motion of the video frame, which is well suited to estimating overall global motion of video frames for the digital video image stabilization.

The pyramid block-based motion estimation performs motion estimation for each frame of the video relative to a reference frame. In general, the reference frame is a consecutive frame (e.g., the immediately preceding or following frame) in the video sequence. Alternatively, every third frame can be used as a reference for the next two frames of video, or other selection of reference frame can be made. For the motion estimation the video frame is divided into a regular grid of blocks, and the motion estimation calculates a motion vector or displacement of each block of the video frame relative to closely matching image content in the reference frame.

Figure 3:
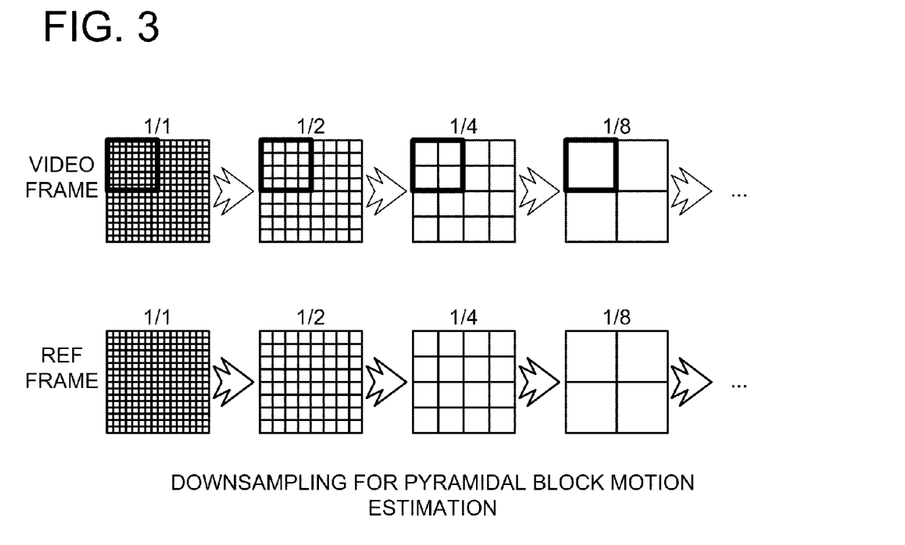
FIG. 3 is a diagram illustrating downsampling of a video frame for pyramid block based local motion estimation.

The pyramid block-based motion estimation begins by repeatedly down-sampling the resolution of both the video frame and its reference frame by half using a downsampling shader on the GPU of the computing device. In the example shown in FIG. 3, the video frame and reference frame are downsampled by half three times over to produce versions of the video frame and reference frame at full resolution, ½ resolution, ¼ resolution, and ⅛ resolution. The video frame and reference frame can be downsampled in resolution a fixed number of times, or can be downsampled a variable number of times dependent on the size and original resolution of the video frame according to available image buffer space and processing resources of the computing device. Alternatively, the video frame and reference frame can be downsampled fewer or more times than the example shown in FIG. 3. It should be understood that the example illustrated in FIG. 3 is illustrative only, and actual video frames processed by the digital video image stabilization technique generally would have a larger number of pixels and higher original resolution than the example shown.

For each resolution of the video frame, the pyramid block-based motion estimation divides the video frame into a grid of blocks. The same size of block is used at each resolution. Preferably a relatively large block size, such as 16×16 or 8×8 pixels is used. In this way, each block of the lowest resolution image will split into 4 blocks of the same block size at the corresponding location in the next higher resolution image, which effectively provides a pyramid structure or hierarchy relationship of blocks in the lowest resolution image to those at the corresponding location in the higher resolution images. For purposes of illustration, the blocks in the higher resolution versions of the video frame (i.e., 1/1, ½ and ¼ resolution) that are in a pyramid structure relationship to the upper-left block of the ⅛ resolution image are shown within the thick line boundary in FIG. 3.

Figure 4:
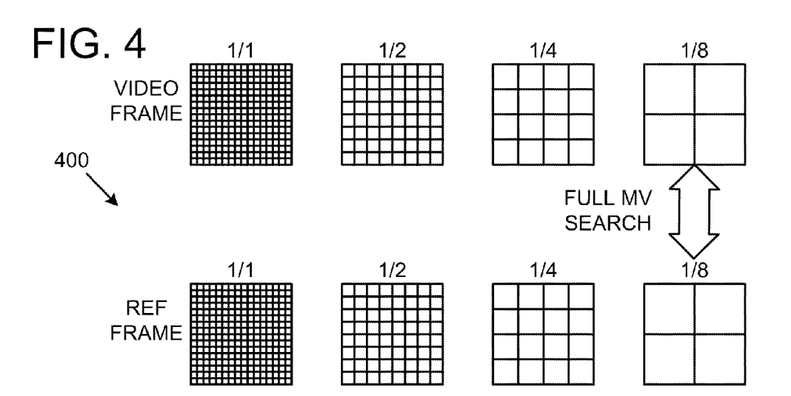
FIGS. 4, 5, 6 and 7 are diagrams illustrating processing of an example video frame for pyramid block based local motion estimation.

Next, the pyramid block-based motion estimation performs a full search based on sum of absolute difference (SAD) on each block in the lowest resolution image over the full reference frame to find a position of matching image content in the reference frame. This produces a local motion vector of each block in the lowest resolution video frame corresponding to its displacement from matching image content in the reference frame. This full search is performed at the lowest resolution version of the video frame and reference frame only as shown in FIG. 4.

Figure 5:
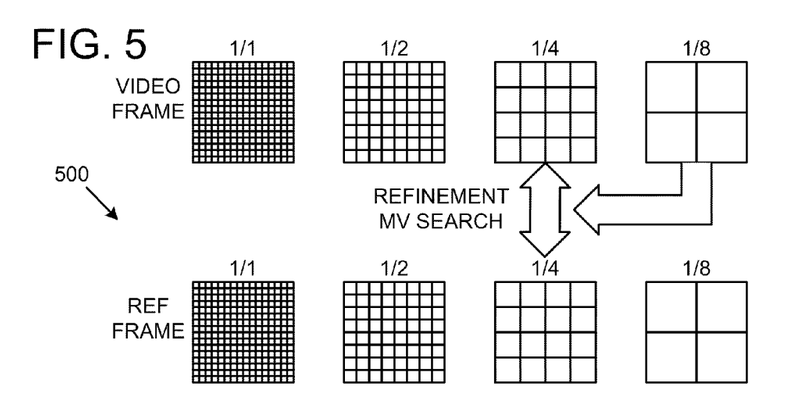
Figure 6:
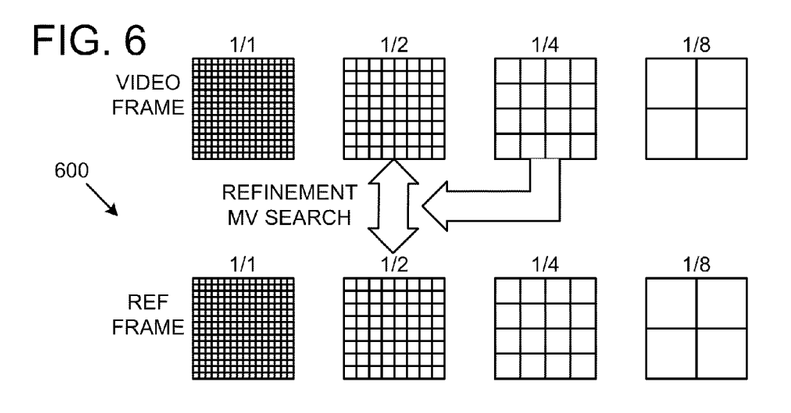
Figure 7:
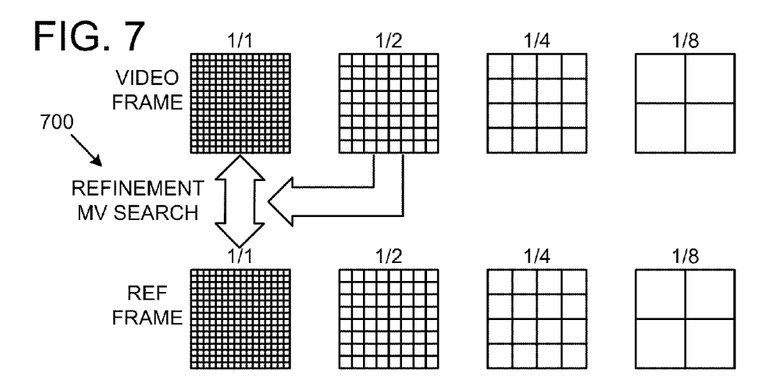

As illustrated in FIGS. 5-7, the pyramid block-based motion estimation then performs refinement motion estimation searching at each successive higher resolution version of the video frame relative to the reference frame up to the original resolution video frame. As previously mentioned, each block of a lower resolution image splits into four blocks at the corresponding location of the next higher resolution version of the video frame. The motion vector calculated via the motion estimation search for the block in the lower resolution image is used as the starting point of refinement motion estimation searches for each of the four blocks in the pyramid structure at the next higher resolution version of the video frame. This refinement search using the pyramid structure relationship of the blocks in the lower resolution video frame to the four corresponding blocks in the next higher resolution video frame emphasizes consistency in the motion estimation calculation among neighboring blocks. As the refinement search is repeated for each successive higher resolution version of the video frame, this emphasized consistency among neighbors provides a more consistent set of local motion vectors for the blocks in the original resolution image upon which to base the global motion transform estimation discussed below.

Once the GPU shader finishes the local motion estimation at the original video frame resolution, the motion vector along with the sum of differences result and variance for each block of the original resolution video frame is copied to the CPU for the global motion transform estimation.

Motion Vector Processing for Global Motion Transform Estimation

With reference again to FIG. 2, the motion vector processing to estimate global motion transform part 220 of the digital video image stabilization process 200 in one example implementation is performed on the central processing unit (CPU) of the computing device. The digital video image stabilization techniques can use a single pass mode of the motion vector processing, which is suitable for a real time processing during video playback, video streaming or transmission. Alternatively, a two pass mode of the motion vector processing can be employed that provides a better video stabilization quality at a cost of increased computation time. The two pass mode therefore may be more suitable for off-line video processing scenarios, which are not subject to the time constraints of real time video playback and for which a high video stabilization quality is desired.

Figure 8:
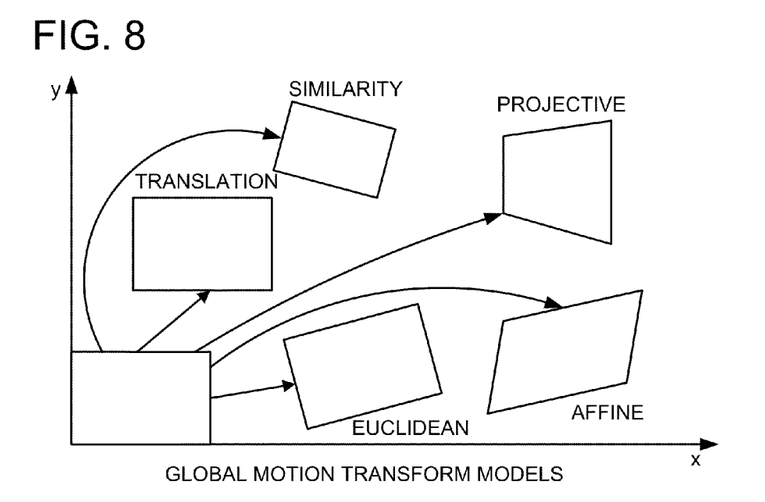
FIG. 8 is a diagram illustrating global motion transform models, including a similarity model of global motion transform used for digital video image stabilization.

FIG. 8 illustrates various global motion transform models that could be used to estimate jittery video motion from hand shakiness, including translation similarity, Euclidean, project and affine motion transform models. In an example implementation presented herein, the motion vector processing uses the similarity global transform model with translation, rotation and zoom parameters as shown in the following equation (1):

$$\begin{bmatrix} x' \\ y' \\ 1 \end{bmatrix} = \begin{bmatrix} s\cos\beta & s\sin\beta & tx \\ -s\sin\beta & s\cos\beta & ty \\ 0 & 0 & 1 \end{bmatrix} \cdot \begin{bmatrix} x \\ y \\ 1 \end{bmatrix} \quad (1)$$

where x and y are the original position, x' and y' are the transformed position, and s, $\beta$, $t_x$, $t_y$ are zoom, rotation and translation parameters, respectively.

In general, most users will experience shaky motion effects on translation, rotation and zoom only. Accordingly, the similarity motion transform model fits the application of video stabilization well to model the hand shakiness of the camera operator. However, alternative implementations of the global motion transform estimation could use other models that model additional or fewer aspects of video jitter from hand shakiness.

One Pass Motion Vector Processing in Real Time Mode

Figure 9:
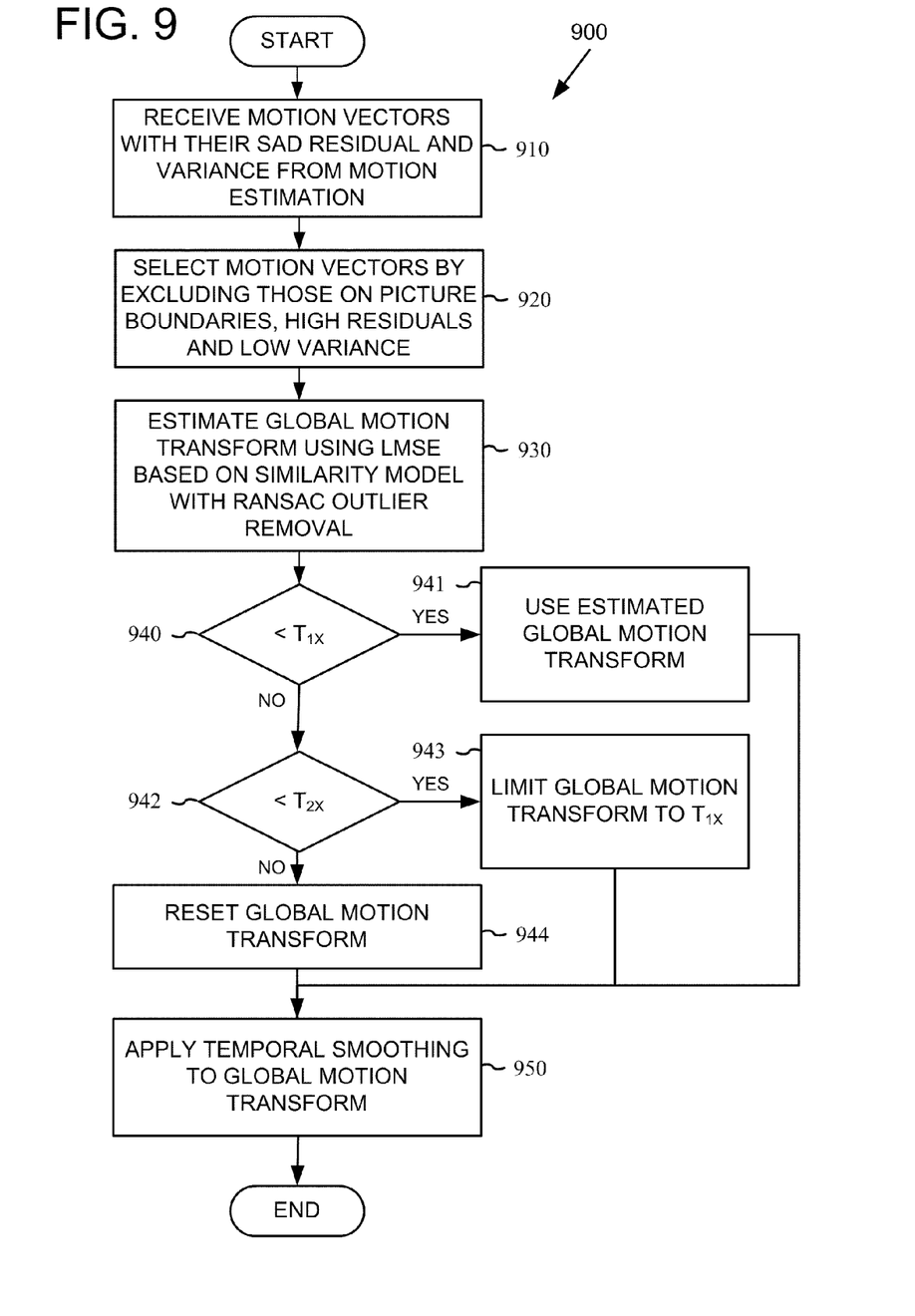
FIG. 9 is a flow diagram illustrating a single pass processing of the motion vectors for a video frame to estimate a global motion transform of jitter motion due to hand shakiness, such as for use in a real time mode digital video image stabilization.

FIG. 9 illustrates an example implementation of a one pass motion vector processing 900 for estimating global motion transform of video frames, which is suitable to a real time processing mode. The motion vector processing is applied to the motion vectors for each video frame of a scene in a video sequence, such as those produced via the pyramid block-based motion estimation described above. The example implementation begins at action 910 by receiving information of the motion vectors for a video frame. In addition, the example motion vector processing 900 also receives information of the residual value for each block relative to that of its matching block at the motion vector position in the reference frame, which is the sum of absolute differences (SAD) value calculated during the motion vector estimation. Further, the example motion vector processing 900 receives a value of the variance in image content of the original block in the video frame, which may also be calculated during the motion vector estimation.

In action 920, the one pass motion vector processing 900 selects a set of the more reliable motion vectors upon which to base the global motion transform estimation. In one example implementation, the one pass motion vector processing 900 selects motion vectors based on three rules. First, the motion vectors on picture boundaries may not be reliable, and therefore are not selected. For example, after camera motion from frame to frame, picture contents at the boundary blocks may be partially missing. Second, a large residual error after motion compensation of a block (e.g., the SAD value for the block is large) may indicate unreliable motion estimation. The motion vectors for blocks with large motion compensation residuals (as indicated by large SAD value calculated during motion estimation for the block) therefore also are not selected. Third, the motion estimation for blocks with low original variance may not be reliable, so the motion vectors for such blocks also are not selected. In alternative implementations, the processing 900 can base the selection of the set of motion vectors on fewer or additional criteria of reliability.

In action 930, the motion vector processing 900 calculates an estimate of the global motion transform of each frame based on the motion vectors selected in action 920. In one example implementation, the global motion transform is estimated using equation (1) for the similarity global motion model discussed above. Alternatively, the global motion transform can be estimated based on another motion model. For estimating the global motion transform, the motion vector processing 900 uses a Random Sample Consensus (RANSAC) method to detect and eliminate motion vectors that are outliers. More particularly, in the RANSAC method, two motion vectors are chosen at random out of the set of motion vectors selected in action 920. The motion vector processing then solves equation (1) using Least Mean Square Error (LMSE) fit to determine values of s, $\beta$, $t_x$, $t_y$ parameters for the two randomly selected motion vectors. The RANSAC method then determines a number of the other motion vectors that also are consistent with this solution of the global motion transform equation parameters. The RANSAC method repeats the random selection of other pairs of motion vectors until a largest group of motion vectors consistent with the solution is found. This eliminates motion vectors that are considered outliers, or inconsistent with the consensus LMSE solution for the parameters of the global motion transform.

In action 940-944, the motion vector processing performs error detection and correction by subjecting the estimate of the parameters for global motion transform to two limits for each of zoom, rotation and translation motion. In the flow diagram, the two limits are denoted as a lower limit ($T_{1x}$) and a higher limit ($T_{2x}$), where $T_{1x}<T_{2x}$ and x represents zoom, rotation or translation. The two limits may be empirically derived through experimentation on a representative large sample of videos that exhibit jittery video motion, and represent a statistical probability as being global motion representative of jittery video motion. As shown in the actions 940-944, if the global motion transform parameters (s, $\beta$, $t_x$, $t_y$) are less than their lower limit, the global motion transform as estimated in action 930 is used. Otherwise, if the global motion transform parameters for zoom, rotation and translation exceed the lower limit, but remain less than an upper limit, then the motion vector processing limits the global motion transform to the lower limit as shown at action 943. If the global motion transform estimated at action 930 exceeds the upper limit, then the global motion transform is reset. These actions are thus intended to detect excessive global motion that would not be characteristic of jittery video motion from a shaky hand, and then correct from over-compensation.

A last action 950 of the motion vector processing 900 applies temporal smoothing to the global motion transform. In one example implementation, the global motion transform estimates for a sequence of video frames of a scene are filtered by a 31-tap Gaussian filter, as shown in the following equation (2).

$$W_t' = C_{t-15} \times (W_{t-1} W_{t-2} \ldots W_{t-15})^{-1} + C_{t-14} \times (W_{t-1} W_{t-2} \ldots W_{t-14})^{-1} + C_t \times I + \ldots + C_{t+14}(W_{t+1} W_{t+2} \ldots W_{t+14}) + C_{t+15}(W_{t+1} W_{t+2} \ldots W_{t+15}) \quad (2)$$

The notation ($W_{t-1} W_{t-2} \ldots W_{t-15}$) denotes matrix inversion. In this equation (2), $W_t'$ is the global motion transform after smoothing at time t, and $W_{t-i}$ is the global motion transform before smoothing at time (t−i). The values $C_{t-i}$ are the Gaussian filter coefficients, and I is the identity matrix. In real time video playback or transcoding scenarios, this size of filter imposes a delay of 15 pictures. Alternative implementations can use a longer or shorter filter size, and alternatively can use other type filter including an adaptive filter.

Two Pass Motion Vector Processing in Off Line Mode

Figure 10:
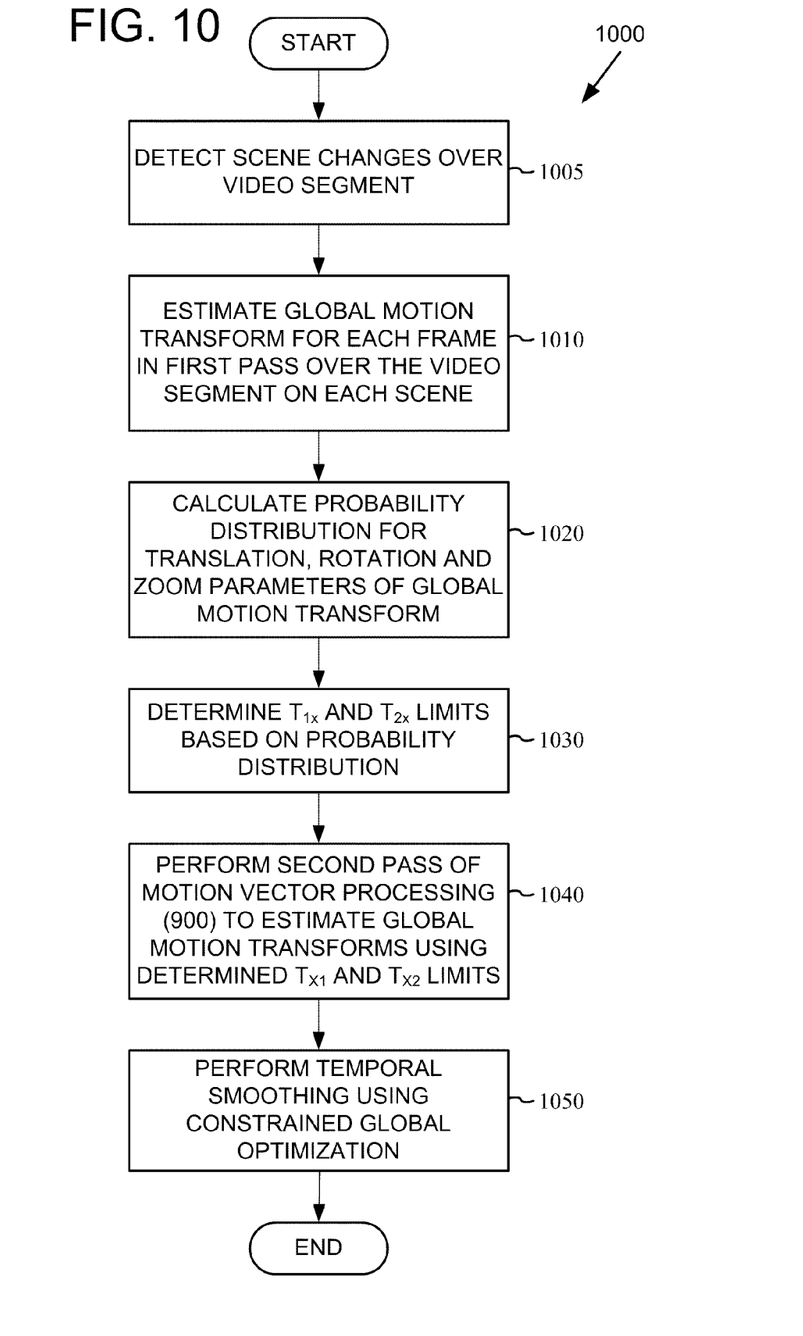
FIG. 10 is a flow diagram illustrating a two pass processing of the motion vectors for a video frame to estimate a global motion transform of jitter motion due to hand shakiness, such as for use in an off-line mode digital video image stabilization.

The estimation of the global motion transform can alternatively be done using a two pass motion vector processing (such as an example two pass motion vector processing 1000 shown in FIG. 10), which offers better quality of video image stabilization but at a cost of a much increased computation time. Two pass processing also generally imposes less convenience on the user, because the user is forced to wait until the end of the video stabilization processing to view the results. Due to its increased computational load, the two-pass motion vector processing typically is better suited to run as an off-line mode. The two-pass arrangement of the motion vector processing permits better optimization of the error detection and correction part, and the temporal smoothing part of the motion vector processing. In a first pass, the motion vector processing can gather additional information for use in these parts of the processing, which can then be applied in a second motion vector processing pass.

As illustrated at action 1005 in FIG. 10, the two-pass motion vector processing 1000 performs scene change detection over the video segment during a first pass. The scene change detection can be performed using conventionally known methods. Then, in action 1010, the two-pass motion vector processing 1000 produces estimates of the global motion transform for each video frame of the scene for the first pass, such as by applying the same actions as in actions 910, 920 and 930 of the single pass motion vector processing 900 of FIG. 9. In this first pass, these estimates of the global motion transform are merely gathered to produce statistical information to better optimize global motion transform estimates in a second pass. Accordingly, the global motion estimates in the first pass are not directly used in the image warping 230 of the video image stabilization process 200 to compensate jittery video motion. Instead, at action 1020, the two-pass motion vector processing 1000 calculates minimum and maximum values, and probability distributions for the translation, rotation and zoom parameters of the global motion transform (e.g., $s_{min}$, $s_{max}$, $\beta_{min}$, $\beta_{max}$, $t_{xmin}$, $t_{xmax}$, $t_{ymin}$, $t_{ymax}$, p(s), p($\beta$), p($t_x$), and p($t_y$)) across all frames on each scene of the video segment. Alternatively, the probability statistics could be gathered for the video segment as a whole, and not per individual scene.

Based on these empirical probability distributions of the parameters for each scene, the two-pass motion vector processing 1000 at action 1030 determines the lower and upper limits ($T_{1x}$ and $T_{2x}$) in each scene for each of the global motion transform parameters (s, $\beta$, $t_x$, $t_y$). For example, the lower and upper limits can be chosen to correspond to certain probability thresholds $p_1$ and $p_2$. In one example, the probability thresholds $p_1$ and p2 are 95% and 98%, respectively. In other words, 95% of the values of the parameter observed in the first pass for the scene are within the limit $T_{1x}$; and 98% of the observed parameter values are under the upper limit $T_{2x}$. In alternative implementations, the two-pass motion vector processing can determine the limits based on other probability thresholds or on some other empirical probability-based criteria. In addition, the lower and upper limits could be bounded by hard limits As compared to the single-pass motion vector processing 900 in FIG. 9, this setting of the parameter limits ($T_{1x}$ and $T_{2x}$) based on empirical probability statistics of the video permits the error correction and detection applied to the global motion transform to be adaptive to the particular content of the video.

At action 1030, the two-pass motion vector processing 1000 then performs a second pass of the motion vector processing. For this second pass, the processing 1000 performs processing as done in actions 910, 920, 930 and 940-944 of the single pass motion vector processing 900. For the limits ($T_{1x}$ and $T_{2x}$) applied in actions 940-944 of this second pass, the two-pass process uses the limits determined based on the probability statistics of the video that were gathered in the first pass. Because these limits are adapted to the content of the subject video, the two-pass motion vector processing 1000 should perform better quality error detection and correction using these adaptive limits.

The two-pass motion vector processing also can achieve better quality digital video image stabilization (compared to the single pass motion vector processing) by also performing the temporal smoothing globally over the video segment. In one example implementation of the two-pass motion vector processing 1000, the processing performs temporal smoothing using a constrained global optimization, instead of the sliding window approach of the single-pass motion vector processing. One example of such constrained global optimization includes determining a constraint for over-smoothed global motion transforms from averaging the global motion transforms for a number N of video frames as an upper limit for temporal smoothing, where N can be a value in the range [10, 15] for over-smoothing. A convex optimization is then performed under the over-smoothing constraint. In one example implementation, the target function For example, one target function could be specified as, $$T = \mathrm{argmin}_{W_j} \left( \sum_{j=0}^{M} \sum_{i=j-N}^{j+N} C_i \times D(W_j, W_{oi}) \right) + \rho \left( \sum_{j=0}^{M} D(W_i, W_{si}) \right) \quad (3)$$

In the target function equation (3), the first term means the final smooth transform $W_j$ should be similar to original transform and its neighbor transforms, $W_{ci}$, with different weighting coefficients $C_i$ in a window. The second term means final smooth transform $W_j$ should be similar to the over-smoothed $W_{si}$ as a constraint with weighting $\rho$. The value is a distance D measurement metric, which could be the distance between the transformed coordinates of the four image corners with $W_j$ and $W_{oi}$. Convex optimization could apply to minimize the target function.

Image Warping with Global Motion Transform

With reference again to FIG. 2, the digital video image stabilization process 200 finally performs image warping 230 based on the global motion transforms produced using either the single or two-pass motion vector processing 220. The image warping may be done in the GPU simply by using the GPU D3D APIs and/or a customized bi-cubic vertex shader to apply an image warping in an opposite direction from the estimate of global motion transform due to jittery video motion. In order to provide enough video content at the boundaries of the video frame to permit image warping, the video frame is cropped in one example implementation by about τ % at the boundaries, which could typically be 10% with the one-pass processing mode and a variable (adaptive) percent for different scenes in the two-pass processing mode. This allows a display port to be moved within the content of the video frame by the image warping, which then forms the image-stabilized video for output.

As can be understood from action 944 in the motion vector processing, when the global motion exceeds the amount of jitter video motion that could be due simply to a shaky hand, the estimated global motion transform is simply reset. In this way, no image warping is applied for global video motion that exceeds the limits characteristic of jitter from hand shakiness. The video frame is instead played with its actual motion, without any compensation for hand shakiness.

Example Computing Environment

Figure 11:
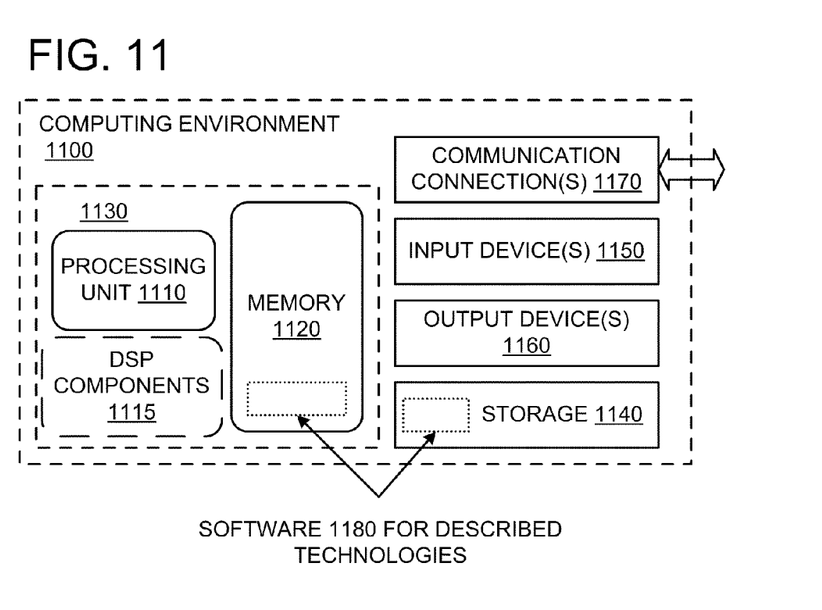
FIG. 11 is a block diagram of a computing environment in which the digital video image stabilization techniques may be practiced.

FIG. 11 illustrates a generalized example of a suitable computing environment 1100 in which described embodiments, techniques, and technologies may be implemented. For example, the computing environment 1100 can be one of the computing devices (e.g., a computer server, personal computer, laptop or other computing device) on which the digital video image stabilization process 200 of FIG. 2 is run.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement the technologies described herein.

In addition to the central processing unit 1110, the computing environment can include other processing resources, such as digital signal processing DSP or multimedia components 1115. The DSP components 1115 may be any of the resources that can be utilized advantageously for the digital video image stabilization process by the generic platform library implementation discussed above in connection with FIG. 1. For example, the DSP components may include multimedia DSP ASIC units, GPU shader units, multicore CPU, advanced multimedia instruction sets for the CPU, and etc.

A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal.

Computer-readable media are any available media from which data and processor instructions that can be accessed within a computing environment 1100. By way of example, and not limitation, within the illustrated computing environment 1100, computer-readable media include memory 1120 and/or storage 1140. As should be readily understood, the term computer-readable storage media includes the media for storage of data and program instructions such as memory 1120 and storage 1140, and not modulated data signals alone.

Example Cloud Computing Network Environment

Figure 12:
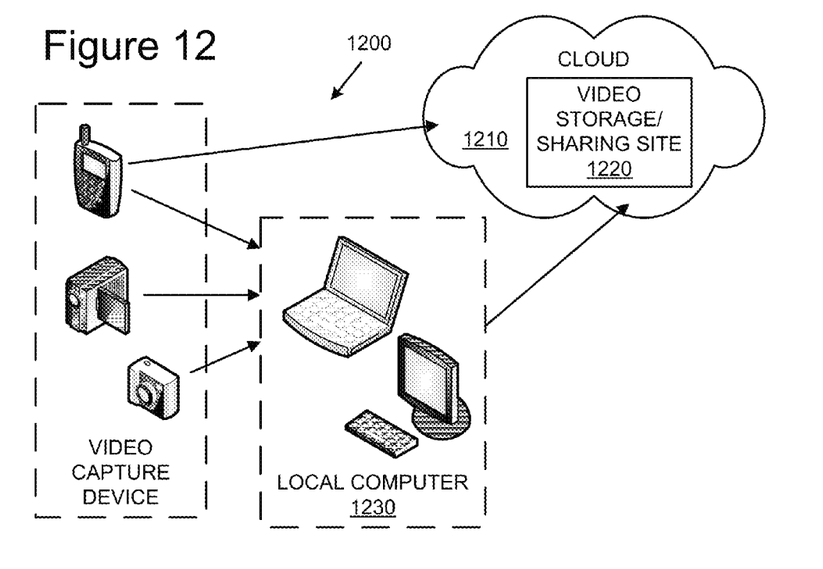
FIGS. 12 and 13 are block diagram of a cloud computing network environment in which the digital video image stabilization techniques may be practiced.
Figure 13:
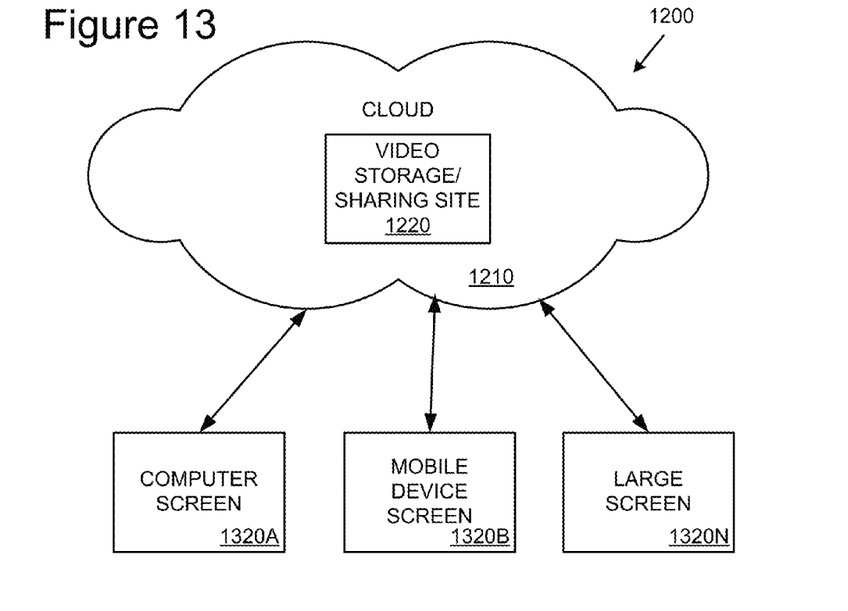

FIGS. 12 and 13 illustrate a generalized example of a suitable networking environment 1200 for cloud computing in which the above described digital video image stabilization may be practiced.

In example cloud computing network environment 1200, various types of computing services for video sharing, storage or distribution (e.g., video sharing or social networking sites) are provided by a collection of network-accessible computing and storage resources, referred to as the cloud 1210. For example, the cloud 1210 can comprise a collection of server computing devices, which may be located centrally or at distributed locations, that provide cloud-based services to various types of users and devices connected via a network such as the Internet.

In example environment 1200, the cloud 1210 provides services (such as video storage, video sharing or social networking services, among other examples) for user computing devices. Services can be provided in the cloud 1210 through cloud computing service providers, or through other providers of online services. For example, the cloud-based services can include a video storage service, a video sharing site, a social networking site, or other services via which user-sourced video is distributed for viewing by others on connected devices 1320A-N.

The user may use various mobile video capture devices to record video, such as video camcorders, digital cameras with video mode, mobile phones, and handheld computing devices. The user can upload video to a service on the cloud 1210 either directly (e.g., using a data transmission service of a telecommunications network) or by first transferring the video first to a local computer 1230, such as a laptop, personal computer or other network connected computing device.

As shown in FIG. 13, video can be later downloaded, streamed and/or otherwise played back from cloud based video storage or sharing site to other connected computer devices which may have a variety of screen display size factors 1320A-N. Connected device 1320A represents a device with a mid-size display screen, such as may be available on a personal computer, a laptop, a tablet or other like network connected devices.

Connected device 1320B represents a device with display screen with form factors designed to be highly portable (e.g., a small size screen). For example, connected device 1320B could be a mobile phone, smart phone, personal digital assistant, and the like.

Connected device 1320N represents a connected device with a large viewing screen. For example, connected device 1320N could be a television screen (e.g., a smart television) or another device that provides video output to a television or a video projector (e.g., a set-top box or gaming console), or other devices with like video display output.

In the illustrated cloud-computing network environment 1200, the digital video image stabilization can be implemented and performed at various stages of the video sharing, storage and distribution, and by various of the depicted devices depending on the desired use scenario. In one example scenario, the digital video image stabilization is implemented in software on the local computer 1230, and applied when the video is either initially transferred to the local computer or when uploaded to the cloud-based service. In another scenario, the digital video image stabilization is implemented in the cloud, and applied to video as it is uploaded to and stored in the cloud. In another scenario, the digital video image stabilization is implemented by cloud computing services and applied when the video is played, transferred to or distributed to another connected device or service. In yet another scenario, the digital video image stabilization is implemented by cloud computing services, and applied when trans-coding the video for presentation at suitable resolution or streaming at suitable transmission bandwidth for the connected device on which it is to viewed. In still other scenarios, the digital video image stabilization can be performed on the connected device at playback.

Example Alternatives and Combinations

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto

We claim:

1. One or more computer-readable media storing computer-executable instructions for causing a computing device programmed thereby to perform a method of digital video stabilization, the one or more computer-readable media including non-volatile memory or a storage device, the method comprising:
    evaluating the computing device to determine availability of any of various multimedia digital signal processing ("DSP") components on the computing device;
    determining from the results of said evaluating which available multimedia DSP component to utilize for at least one part of digital video stabilization according to a hierarchical structure for ordering multimedia DSP components by criteria comprising at least performance of the digital video stabilization, the digital video stabilization comprising at least local motion vector estimation to produce estimated local motion vectors, processing the estimated local motion vectors for estimation of a global motion transform representing jittery video motion, and image warping based on the global motion transform to compensate the jittery video motion; and
    performing digital video stabilization of a video segment on the computing device utilizing the determined available multimedia DSP component for said at least one part of the digital video stabilization, wherein the performing the digital video stabilization includes warping at least one frame of the video segment based on the global motion transform that applies for the at least one frame of the video segment.

2. The one or more computer-readable media of claim 1 wherein the hierarchical structure comprises in order multimedia DSP ASIC units, GPU shader units, multicore CPU and single core CPU.

3. The one or more computer-readable media of claim 1 wherein, when said evaluating determines a GPU shader is available on the computing device, then the digital video stabilization utilizes the GPU shader for the local motion vector estimation.

4. The one or more computer-readable media of claim 3 wherein, when said evaluating determines the GPU shader is available on the computing device, then the digital video stabilization further utilizes the GPU shader for the image warping.

5. The one or more computer-readable media of claim 1 wherein a library of an operating system includes a set of library functions to control the digital video stabilization, and wherein the library provides a programmatic interface for applications to make use of the digital video stabilization, the library including at least one call to an operating system service or a DSP interface as part of the evaluating and including at least one call to a DSP interface to perform the at least one part of the digital video stabilization.

6. The one or more computer-readable media of claim 1 wherein an application executable controls the digital video stabilization, the application executable including at least one call to an operating system service or a DSP interface as part of the evaluating and including at least one call to a DSP interface to perform the at least one part of the digital video stabilization.

7. The one or more computer-readable media of claim 1 wherein a library of an operating system controls the digital video stabilization, the library including at least one call to a DSP interface as part of the evaluating and including at least one call to a DSP interface to perform the at least one part of the digital video stabilization.

8. A method of digital video stabilization, the method comprising performing steps on a computing device of:

performing local motion vector estimation for a frame of a plurality of frames of a scene of a video segment, wherein the local motion vector estimation comprises for said frame:
        downsampling said frame and a reference frame associated with said frame by one or more times to form a plurality of versions of said frame at a plurality of resolutions, wherein a lowest resolution version of said frame has a plurality of blocks associated as a pyramid structure to a successively larger number of blocks at corresponding locations in each higher resolution version of said frame;
        for the lowest resolution version of said frame, estimating motion vectors of the blocks of said lowest resolution version frame using an initial motion vector estimation processing of the associated lowest resolution version reference frame;
        for each successively higher resolution version of said frame, estimating motion vectors of the blocks of said successively higher resolution version frame using a refinement search starting from the motion vector estimated for the associated block of the preceding lower resolution version frame according to the pyramid structure; and
        producing estimated local motion vectors for the blocks of the original resolution version of said frame;
    processing the estimated local motion vectors of said frame for estimation of a global motion transform representing jittery video motion, including selecting a set of motion vectors to use for estimation of the global motion transform out of the produced estimated local motion vectors of said frame, wherein said selecting the set of motion vectors comprises one or more of:
        excluding motion vectors on picture boundaries,
        excluding motion vectors having a high motion compensation residual, and
        excluding motion vectors for blocks with low image content variation; and
    performing image warping on said frame based on the global motion transform estimated for said frame to compensate for the jittery video motion.

9. The method of claim 8 wherein said processing the estimated local motion vectors of said frame to estimate the global motion transform processes the local motion vectors of said frame using a random sample consensus for removal of outlier motion vectors.

10. The method of claim 8 wherein said global motion transform is based on a similarity model of video motion.

11. The method of claim 8 wherein said processing the estimated local motion vectors of said frame comprises:
    comparing the global motion transform estimated from processing the local motion vectors of said frame to lower and upper limits;
    if the estimated global motion transform exceeds the upper limit, resetting the global motion transform;
    if the estimated global motion transform exceeds the lower limit but not the upper limit, limiting the global motion transform to the lower limit; and
    otherwise, using the estimated global motion transform to be representative of jittery video motion.

12. The method of claim 11 further comprising:
    as a first pass over the frames in the scene of the video segment, processing the frames to estimate global motion transforms for the frames in the scene of the video segment;

determining probability distributions of parameters of the global motion transforms for the frames in the scene of the video segment;

determining said lower limit and said upper limit based on the probability distributions; and applying said lower limit and upper limit to estimates of the global motion transform in a second pass processing the frames in the scene of the video segment.

13. The method of claim 8 wherein said processing the estimated local motion vectors of said frame comprises:

processing the motion vectors of said frame using random sample consensus and least mean square error to estimate parameters for a global motion transform based on a similarity motion model;

comparing the estimated parameters of the global motion transform to lower and upper limits on said parameters;

if any of the estimated parameters of the global motion transform exceed their upper limit, resetting the global motion transform;

if any of the estimated parameters of the global motion transform exceed the lower limit but not the upper limit, limiting the estimated parameters of the global motion transform to their lower limit; and otherwise, using the estimated global motion transform to be representative of jittery video motion.

14. The method of claim 8 wherein said processing the estimated local motion vectors of said frame comprises applying temporal smoothing to the estimated global motion transform using a Gaussian filter.

15. The method of claim 8 wherein said processing the estimated local motion vectors of said frame comprises applying temporal smoothing to the estimated global motion transform using a constrained global optimization over the frames in the scene of the video segment.

16. The method of claim 8 wherein a library of an operating system includes a set of library functions to control the digital video stabilization, and wherein the library provides a programmatic interface for applications to make use of the digital video stabilization, the library including at least one call to a DSP interface to perform one or more of the local motion vector estimation and the image warping.

17. The method of claim 8 wherein an application executable controls the digital video stabilization, the application executable including at least one call to a DSP interface to perform one or more of the local motion vector estimation and the image warping.

18. The method of claim 8 wherein a library of an operating system controls the digital video stabilization, the library including at least one call to a DSP interface to perform one or more of the local motion vector estimation and the image warping.

19. A digital video processing device for processing video to apply digital video stabilization to the video, the digital video processing device comprising:

a memory storing a generic platform video stabilization library program;

at least one digital signal processing component;

a processing unit operating to execute the video stabilization library program from the memory, wherein said execution of the video stabilization library program comprises:

evaluating the at least one digital signal processing component of the digital video processing device;

determining which of the at least one digital signal processing component to utilize for at least one part of digital video stabilization according to a hierarchical structure for ordering digital signal processing components by criteria comprising at least performance of the digital video stabilization; and performing digital video stabilization on the video in part by processing a frame of the video to estimate local motion vectors of the frame, processing the estimated local motion vectors for estimation of a global motion transform representing jittery video motion, and warping the frame based on the global motion transform to compensate for the jittery video motion, wherein said performing the digital video stabilization executes programming functions in the generic platform video stabilization library program to utilize the determined digital signal processing component for the at least one part of the digital video stabilization.

20. The digital video processing device of claim 19 wherein said processing the frame to estimate local motion vectors of the frame comprises causing the determined at least one digital signal processing component to perform acts of:

downsampling the frame and a reference frame associated with the frame by one or more times to form a plurality of versions of the frame at a plurality of resolutions, wherein a lowest resolution version of the frame has a plurality of blocks associated as a pyramid structure to a successively larger number of blocks at corresponding locations in each higher resolution version of the frame;

for the lowest resolution version of the frame, estimating motion vectors of the blocks of said lowest resolution version frame using an initial motion vector estimation processing of the associated lowest resolution version reference frame;

for each successively higher resolution version of the frame, estimating motion vectors of the blocks of said successively higher resolution version frame using a refinement search starting from the motion vector estimated for the associated block of the preceding lower resolution version frame according to the pyramid structure; and producing the estimated local motion vectors for the blocks of the original resolution version of the frame.

21. The digital video processing device of claim 19 wherein said processing the estimated local motion vectors for estimation of the global motion transform representing jittery video motion comprises performing acts of:

selecting a set of motion vectors to use for estimation of the global motion transform out of the estimated local motion vectors of the frame, wherein said selecting the set of motion vectors comprises:

excluding motion vectors on picture boundaries;

excluding motion vectors having a high motion compensation residual; and excluding motion vectors for blocks with low image content variation.

22. The digital video processing device of claim 19 wherein said processing the estimated local motion vectors for estimation of the global motion transform representing jittery video motion comprises processing the estimated local motion vectors of the frame using random sample consensus and least mean square error to estimate parameters for the global motion transform based on a similarity motion model.

23. The digital video processing device of claim 19 wherein said processing the estimated local motion vectors for estimation of the global motion transform representing jittery video motion comprises:

comparing estimated parameters of the global motion transform to lower and upper limits;

if any of the estimated parameters of the global motion transform exceed their upper limit, resetting the global motion transform;

if any of the estimated parameters of the global motion transform exceed the lower limit but not the upper limit, limiting the estimated parameters of the global motion transform to their lower limit; and otherwise, using the estimated global motion transform to be representative of jittery video motion.

24. The digital video processing device of claim 23 wherein said upper limit and said lower limit are set in a first pass of the digital video stabilization, and wherein said upper limit and said lower limit are compared to the estimated parameters of the global motion transform in a second pass of the digital video stabilization.

25. The digital video processing device of claim 19 wherein said processing the estimated local motion vectors for estimation of the global motion transform representing jittery video motion further comprises applying temporal smoothing to the estimated global motion transform using a Gaussian filter.

\* \* \* \* \*